No. 656,757. Patented Aug. 28, 1900.
F. E. WHITHAM.
FASTENER FOR DRIVING BELTS OR STRAPS.
(Application filed May 29, 1900.)
(No Model.)
FIG. 1.
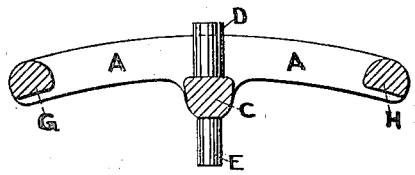
FIG. 2.
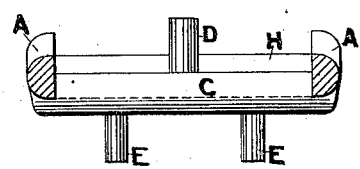
FIG. 3.
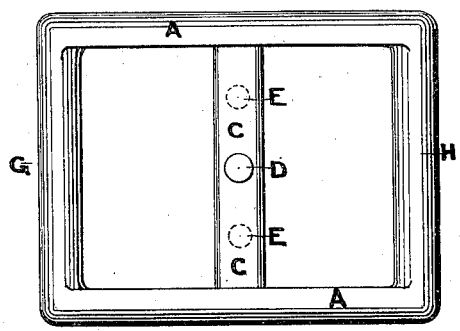
FIG. 4.
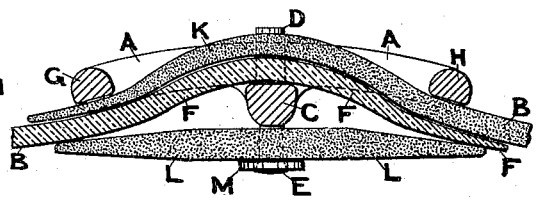
FIG. 5.
FIG. 6.
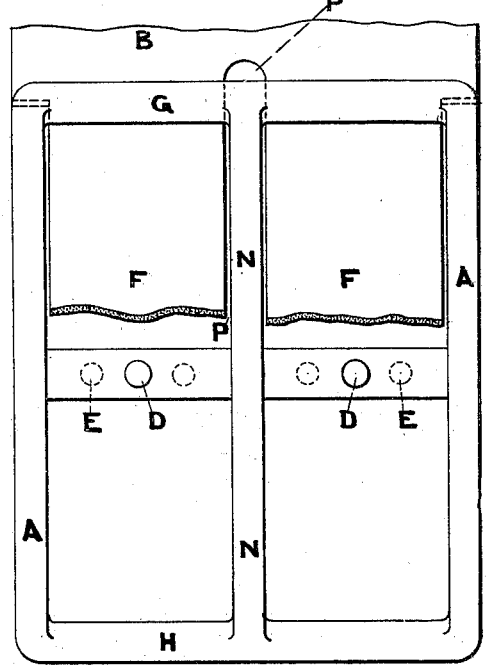
Witnesses
Abm Reed
William Dean
Inventor
Fredric Edmund Whitham
THE NORRIS PETERS CO., PHOTO-LITHO., WASHINGTON, D. C.

UNITED STATES PATENT OFFICE.

FREDRIC EDWARD WHITHAM, OF SOWERBY BRIDGE, ENGLAND.

FASTENER FOR DRIVING BELTS OR STRAPS.

SPECIFICATION forming part of Letters Patent No. 656,757, dated August 28, 1900.

Application filed May 29, 1900. Serial No. 18,365. (No model.)

*To all whom it may concern:*

Be it known that I, FREDRIC EDWARD WHITHAM, a subject of the Queen of Great Britain, residing at Sowerby Bridge, in the county of York, England, have invented certain new and useful Improvements in Fasteners for Driving Belts or Straps, of which the following is a specification.

The object of my invention is to construct a new or improved fastener for driving-belts of all kinds, so as to be cheap, durable, easily and quickly applied, and so effective that the greater the strain or tension upon the belt the greater the grip of the fastener upon the ends of same.

Figure 1 is a longitudinal section of my improved fastener for driving-belts and the like. Fig. 2 is a cross-section of my improved fastener. Fig. 3 is a plan of my improved fastener. Fig. 4 is a longitudinal section of my improved fastener, showing method of fastening or securing the ends of driving straps or belts. Fig. 5 is a plan showing my improved fastener applied to a driving-belt. Fig. 6 is a plan of a modification of my improved fastener when used for large or main driving-belts.

I construct my fastener of a suitable metal frame in the form of a buckle A, bent so as to conform to the periphery of the pulley or drum over which the belt B passes and having a cross-bar or midrib C in the center. Upon the top side of this cross-bar is a stud or projection D, and upon the under side two studs or projections E E. One end F of the belt is passed underneath one end bar G of the fastener over the cross-bar C and underneath the other end bar H, the stud D upon the top side of this cross-bar C passing through a corresponding hole J in the belt. The other end K of the belt B is passed through the fastener in a similar manner, but over the end F of the belt already fixed. A suitable buffer, cover, or packing L, of any suitable material, preferably of the same material as the driving-belt, is placed upon the two studs E E upon the under side of the cross-bar C, the top of which bears against the under side of the belt. A washer M is placed on each stud E E and the ends riveted up, so securing said cover L in position and presenting an even or regular surface to the face of the pulley. This fastener may be of any size and have one or more midribs or cross-bars. Also I preferably form the under sides of the end bars G H and the top side of the cross-bar C flat, so greatly improving the friction or resistance set up by the tension on the belt.

When applying my invention to large or main driving-belts, I prefer to use a fastener such as shown at Fig. 6, with a longitudinal midrib N, so as to strengthen the end bars G H, which are subject to great strain. Also I prefer to divide the ends of the belt B longitudinally, forming a slot P. This slot P allows the end to pass on each side of the midrib N and be secured in the manner before described. By these means the ends of the belts are effectively secured and an even and easy running of the belt obtained. A further advantage of this invention is that besides permanently securing the ends of said driving-belt, should such belt stretch and become too slack, the ends may be easily and quickly released, the belt tightened as required, and again secured. The operation being effected by any unskilled workman, a great saving in time, labor, and expense is obtained.

What I claim as my invention, and desire to secure by Letters Patent, is—

1. The combination, with a curved frame provided with cross-bars at its ends and an intermediate cross-bar provided with upper and lower studs, of the end portions of a belt passing under the end cross-bars and over the intermediate cross-bar and having holes which engage with the upper stud, and a cover-plate secured to the lower stud with its end portions bearing on the belt below the end cross-bars, substantially as set forth.

2. The combination, with a curved frame provided with a longitudinal middle bar, cross-bars at its ends, and an intermediate cross-bar provided with upper and lower studs; of the end portions of a belt provided with slots which engage with the said middle bar, said end portions being passed under the said end cross-bars and over the intermediate cross-bar and having holes which engage with the upper studs, and a cover-plate secured to the lower studs with its end portions bearing on the belt below the end cross-bars, substantially as set forth.

In testimony whereof I hereunto affix my signature in the presence of two witnesses.

FREDRIC EDWARD WHITHAM.

Witnesses:
   ABM. REED,
   GODFREY RHODES.